United States Patent [19]
Kota et al.

[11] Patent Number: 5,495,766
[45] Date of Patent: Mar. 5, 1996

[54] ULTRASONIC SENSOR

[75] Inventors: Masaharu Kota; Kazuya Nakatera, both of Nagaokakyo, Japan

[73] Assignee: Murata Manufacturing Co., Ltd., Japan

[21] Appl. No.: 311,923

[22] Filed: Sep. 26, 1994

[30] Foreign Application Priority Data

Sep. 28, 1993 [JP] Japan ................................. 5-241749

[51] Int. Cl.⁶ ............................................. G01H 11/00
[52] U.S. Cl. ................ 73/652; 73/649; 73/35.11
[58] Field of Search .......................... 73/649, 652, 663, 73/516 R, 35.11

[56] References Cited

U.S. PATENT DOCUMENTS

| | | | |
|---|---|---|---|
| 4,189,655 | 2/1980 | Bruel | 73/516 R |
| 4,228,379 | 10/1980 | Guscott | 310/322 |
| 4,869,257 | 9/1989 | Molnar et al. | 73/633 |
| 5,179,862 | 1/1993 | Lynworth | 73/861.18 |
| 5,185,728 | 2/1993 | Gilchrist | 367/163 |

*Primary Examiner*—Richard Chilcot
*Assistant Examiner*—Max H. Noori
*Attorney, Agent, or Firm*—Ostrolenk, Faber, Gerb & Soffen

[57] ABSTRACT

An ultrasonic sensor (21) includes a case consisting of a case body (21) and a base (23), a piezoelectric diaphragm (25) which is arranged in the case, a conical vibrator (32) which is bonded to an ultrasonic transmitting/receiving side of the piezoelectric diaphragm (25), and a tubular member (24) which is arranged in front of the vibrator (32) for guiding ultrasonics.

9 Claims, 4 Drawing Sheets

ULTRASONIC SENSOR

BACKGROUND OF THE INVENTION

1. Field of the Invention

The present invention relates to an ultrasonic sensor for detecting ultrasonics through a piezoelectric diaphragm, and more particularly, it relates to an ultrasonic sensor which is improved in structure for guiding ultrasonics to a piezoelectric diaphragm.

2. Description of the Background Art

An ultrasonic sensor for detecting breaking of window glass is known as a burglarproof device for an automobile, for example. An example of such an ultrasonic sensor is now described with reference to FIG. 1.

This ultrasonic sensor comprises a case body 1 having an opening in its lower surface, and a base 2 which is mounted on the case body 1 to close the opening. A plurality of through holes are formed in an upper surface of the case body 1, for guiding ultrasonics into the case body 1 therethrough.

On an upper surface of the base 2, on the other hand, support portions 2a are provided integrally with the base 2. A piezoelectric diaphragm 3 is fixed to upper ends of the support portions 2a. This piezoelectric diaphragm 3 is formed as a unimorph type piezoelectric diaphragm by a metal plate 4 and a piezoelectric ceramic plate 5 which is pasted to its lower surface.

An electrode 6 is formed on a lower surface of the piezoelectric ceramic plate 5. The electrode 6 is electrically connected to a terminal 8 by a lead wire 7a, while the metal plate 4 is electrically connected to another terminal 9 by another lead wire 7b.

An equalizer 10 serving as another vibrator is bonded to a central portion of the piezoelectric diaphragm 3 on an ultrasonic receiving side. This equalizer 10 is formed by a rigid material having a conical shape which is open toward the ultrasonic receiving side.

In the aforementioned ultrasonic sensor, a voltage is applied across the terminals 8 and 9 to vibrate the piezoelectric diaphragm, thereby generating ultrasonics. The ultrasonics are reflected by a target, to displace the piezoelectric vibrator 3. A voltage based on this displacement is taken out across the terminals 8 and 9, so that the ultrasonics can be detected.

The aforementioned burglarproof ultrasonic sensor for an automobile must have wide directivity, to be capable of detecting ultrasonics which are caused by every breaking of window glass. The ultrasonic sensor must also have a wide sensitivity frequency band, since the ultrasonics as reflected are varied with the types and broken states of the window glass.

In order to spread the directivity of the aforementioned ultrasonic sensor, the piezoelectric diaphragm 3 may be prepared from that having a small area. If the piezoelectric diaphragm 3 is reduced in area, however, the sensitivity frequency band of the ultrasonic sensor is displaced from that capable of detecting various broken states of window glass, since the resonance frequency of the piezoelectric diaphragm 3 also depends on its dimensions. Further, the bandwidth of a prescribed sensitivity level is narrowed due to separation of two types of combination vibration modes of the piezoelectric diaphragm 3 and the conical equalizer 10. In other words, it is impossible to attain a sufficient sensitivity frequency band.

When the piezoelectric diaphragm 3 is reduced in area, further, sensitivity is reduced due to reduction of the amplitude.

SUMMARY OF THE INVENTION

An object of the present invention is to provide an ultrasonic sensor which can attain wide directivity without reducing a piezoelectric diaphragm in size, thereby implementing both of wide directivity and a wide sensitivity frequency band.

The ultrasonic sensor according to the present invention comprises a case which is provided with at least one through hole in a surface for receiving/transmitting ultrasonics, a piezoelectric diaphragm which is arranged in the case, a vibrator which is bonded to a surface of the piezoelectric diaphragm for transmitting/receiving ultrasonics to be vibrated with the piezoelectric diaphragm, and a tubular member which is arranged in the case in front of the vibrator for guiding ultrasonics from the vibrator to the exterior of the case or vice versa.

The term "vibrator" is directed to a vibrator such as a conical equalizer, for example, which is vibrated with a piezoelectric diaphragm for improving transmission or receiving efficiency for ultrasonics. This vibrator is not restricted to the conical shape, but may have any arbitrary shape.

In the ultrasonic sensor according to the present invention, the tubular member is arranged in front of the piezoelectric diaphragm and the vibrator, thereby improving directivity of the ultrasonic sensor. The reason for this is now described with reference to FIG. 2.

It is assumed that ultrasonics reach a receiving part 11, which is formed by a piezoelectric diaphragm and a vibrator, from a sound source A. If no tubular member 12 is arranged in this case, phase difference is caused between ultrasonics which are transmitted along paths $B_1$ and $B_2$, such that the ultrasonics cancel with each other when the phase difference is integral times the half-wave length. Thus, directivity is reduced.

If the tubular member 12 is arranged, on the other hand, the ultrasonics which are radiated from the sound source A are guided into the tubular member 12 between the path $B_1$ and a path $B_3$. Thus, it is possible to reliably receive the ultrasonics from the sound source A without reducing the area of the receiving part 11, thereby spreading directivity.

Further, ultrasonics which are reflected by a wall surface of the tubular member 12 also reach the receiving part 11, whereby it is also possible to prevent reduction of sensitivity by providing the tubular member 12. In addition, it is not necessary to reduce the area of the receiving part 11, whereby the aforementioned wide directivity can be implemented without narrowing the sensitivity frequency band, by employing a piezoelectric diaphragm and a vibrator of proper dimensions in response to the application.

While the above description has been made with reference to a receiving sensor, this also applies to a transmission sensor.

According to the present invention, as hereinabove described, the tubular member for guiding ultrasonics is arranged in front of the piezoelectric diaphragm and the vibrator, whereby it is possible to extremely spread directivity. Since the directivity is spread by the action of the tubular member, it is not necessary to reduce the area of the piezoelectric diaphragm as employed. Thus, it is possible to provide a transmission or receiving ultrasonic sensor having wide directivity, while maintaining sensitivity frequency characteristics.

According to the present invention, therefore, it is possible to provide an ultrasonic sensor satisfying both of wide directivity and wide sensitivity frequency band width. Thus, it is possible to provide an ultrasonic sensor which is optimumly employed when it is necessary to detect ultrasonics from targets arranged in various directions or to detect ultrasonics of various frequencies in a burglarproof glass breaking detector for an automobile, for example.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
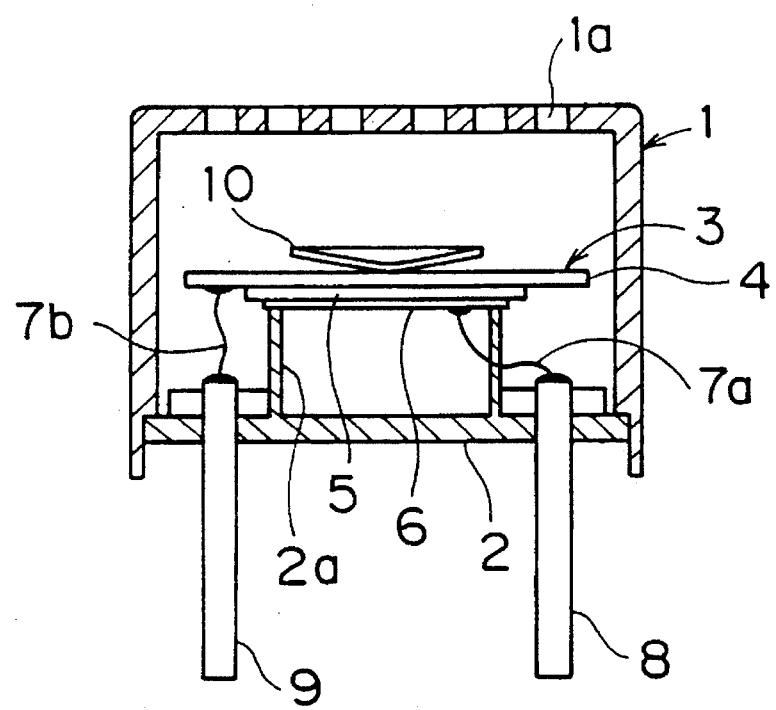
FIG. 1 is a sectional view showing a conventional ultrasonic sensor.
Figure 2:
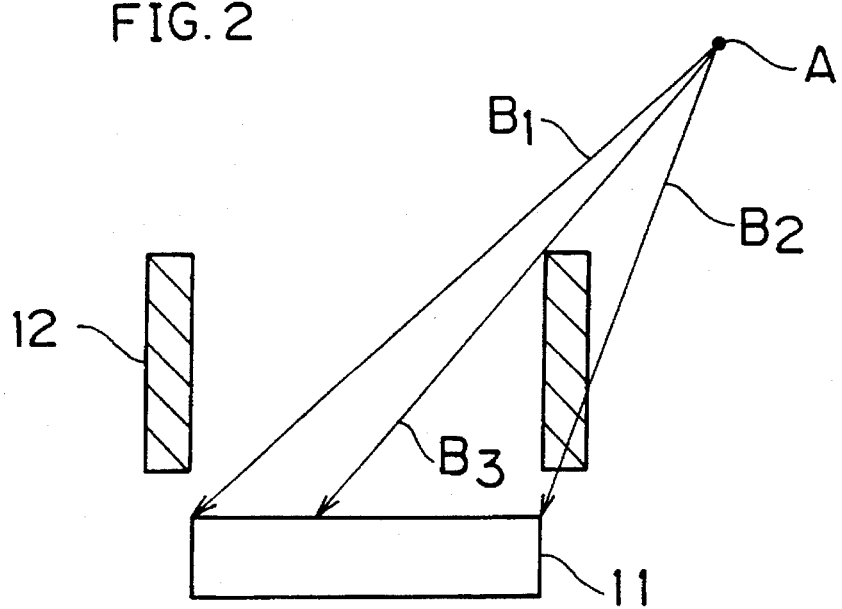
FIG. 2 is a model diagram for illustrating the principle of the present invention.
Figure 3:
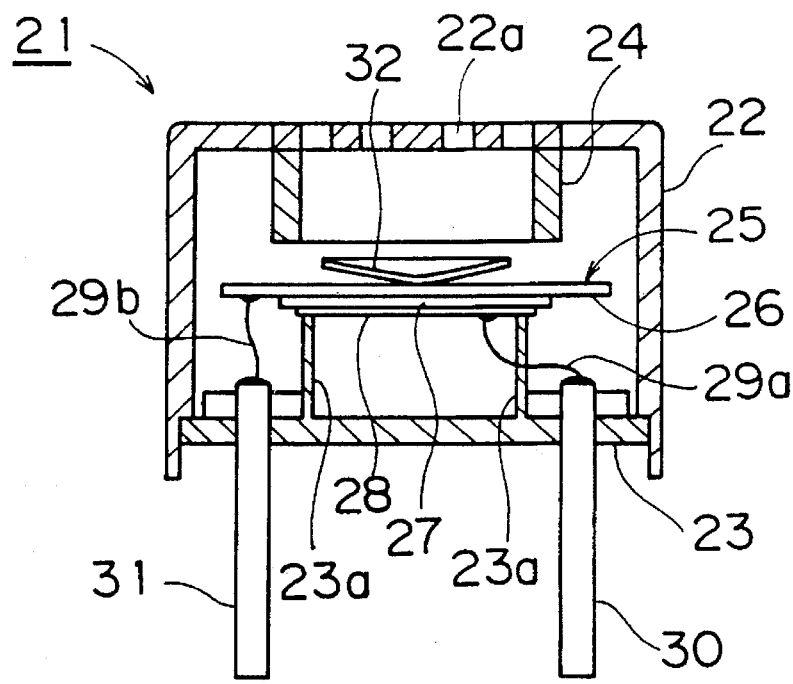
FIG. 3 is a sectional view showing an ultrasonic sensor according to an embodiment of the present invention.

FIG. 3 is a sectional view showing an ultrasonic sensor 21 according to an embodiment of the present invention.

The ultrasonic sensor 21 according to this embodiment comprises a case body 22 having an opening in its one surface, and a base 23. The base 23 is mounted on the case body 22 to close the opening thereof. The case body 22 and the base 23 can be prepared from a proper rigid material such as synthetic resin or a metal, for example.

A plurality of through holes 22a are formed in an upper surface of the case body 22, in order to guide ultrasonics into the case body 22. A cylindrical tubular member 24 is mounted on an inner side of a surface of the case body 22 for receiving the ultrasonics. The tubular member 24, which is made of a rigid material such as synthetic resin or a metal, is adapted to guide the ultrasonics entering the case body 22 from the through holes 22a to a piezoelectric diaphragm and a vibrator as described later.

On the other hand, support portions 23a are integrally provided on an upper surface of the base 23. Alternatively, the support portions 23a may be formed independently of the base 23.

A piezoelectric diaphragm 25 is fixed to upper ends of the support portions 23a. According to this embodiment, the piezoelectric diaphragm 25 is formed by pasting a piezoelectric ceramic plate 27 to a lower surface of a metal plate 26.

An electrode 28 is formed on a lower surface of the piezoelectric ceramic plate 27. This electrode 28 is electrically connected to a lead terminal 30 through a lead wire 29a, while the metal plate 26 is electrically connected to another lead terminal 31 through another lead wire 29b. When a voltage is applied across the lead terminals 30 and 31, therefore, the piezoelectric diaphragm 25 is vibrated in a bending mode. In order to implement such bending mode vibration, upper ends of the support portions 23a are bonded to a vibration nodal point of the piezoelectric diaphragm 26.

On the other hand, a vibrator 32 is bonded to an upper surface of the piezoelectric diaphragm 25, to be vibrated with the same. According to this embodiment, the vibrator 32 is formed by an equalizer having a conical shape, as shown in FIG. 3. This vibrator 32 is made of a proper rigid material such as a metal, for improving ultrasonic receiving sensitivity and widening a sensitivity frequency band.

The tubular member 24 preferably has an inner diameter which is larger by about 1.2 to 1.5 times, for example, than the maximum diameter of the conical vibrator 32, and smaller than the inner diameter of the case body 22.

The vibrator 32 is not restricted to the conical shape shown in FIG. 3 but can be provided in any arbitrary shape so far as the same is capable of the aforementioned action.

In the ultrasonic sensor 21 according to this embodiment, the piezoelectric diaphragm 25 is vibrated in a bending mode when an alternating voltage is applied across the lead terminals 30 and 31, whereby the vibrator 32 is also horizontally vibrated. Consequently, ultrasonics are emitted from the through holes 22a of the case body 22, to be radiated onto a target. The ultrasonics are reflected by the target and introduced into the case body 22 again through the through holes 22a, and further guided by the tubular member 24 to be transmitted to the vibrator 32 and the piezoelectric diaphragm 25. The piezoelectric diaphragm 25 is displaced in a bending mode by the ultrasonics as transmitted, so that a voltage based on this displacement is drawn out across the lead terminals 30 and 31 to enable detection of the ultrasonics.

According to this embodiment, it is possible to spread directivity for ultrasonics to be received as hereinabove described, due to the tubular member 24 which is arranged in front of the vibrator 32. Namely, it is possible to prevent the ultrasonics from canceling caused by phase difference resulting from path difference between the ultrasonics transmitted from the sound source to the vibrator 32 and the piezoelectric diaphragm 25 thereby improving directivity, by providing the tubular member 12. Further, the tubular member 12 has an inner diameter which is substantially identical to the wavelength of the ultrasonics (wavelength× 0.6 to 1.4), and an axial length which is shorter than the wavelength. Therefore, phase difference between the ultrasonics which are reflected by the inner surface of the tubular member 12 is so reduced as to cause no canceling. Due to this action, it is possible to spread directivity for the ultrasonics to be received, while suppressing reduction of the sensitivity by effectively guiding the ultrasonics which are reflected by the inner surface of the tubular member 12 to the piezoelectric diaphragm 32. Further, it is not necessary to particularly reduce the area of the piezoelectric diaphragm 25, since the directivity can be spread by the action of the tubular member 24. Thus, it is possible to provide an ultrasonic sensor which is improved in directivity while maintaining its sensitivity frequency band.

Figure 4:
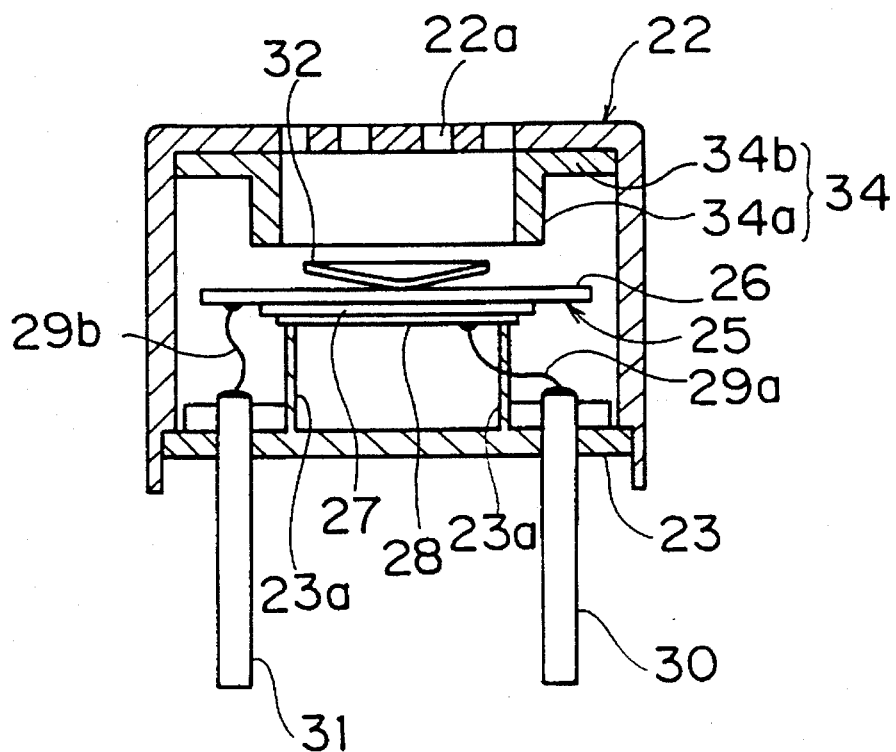
FIG. 4 is a sectional view showing a modification of the embodiment shown in FIG. 3.

While the tubular member 24 is formed by bonding a separately prepared cylindrical member to the inner surface of a top plate of the case body 22 in the embodiment shown in FIG. 3, a tubular member 34 which is provided with a flange portion 34b on an upper end of a tubular part 34a may alternatively be employed as shown in FIG. 4, so that the flange portion 34b is pasted to the inner surface of a top plate of a case body 22 for forming the tubular member 34 in the case body 22.

In the embodiment and the modification shown in FIGS. 3 and 4, the tubular members 24 and 34 may be integrally formed with the case bodies 22 by the same materials.

Figure 5:
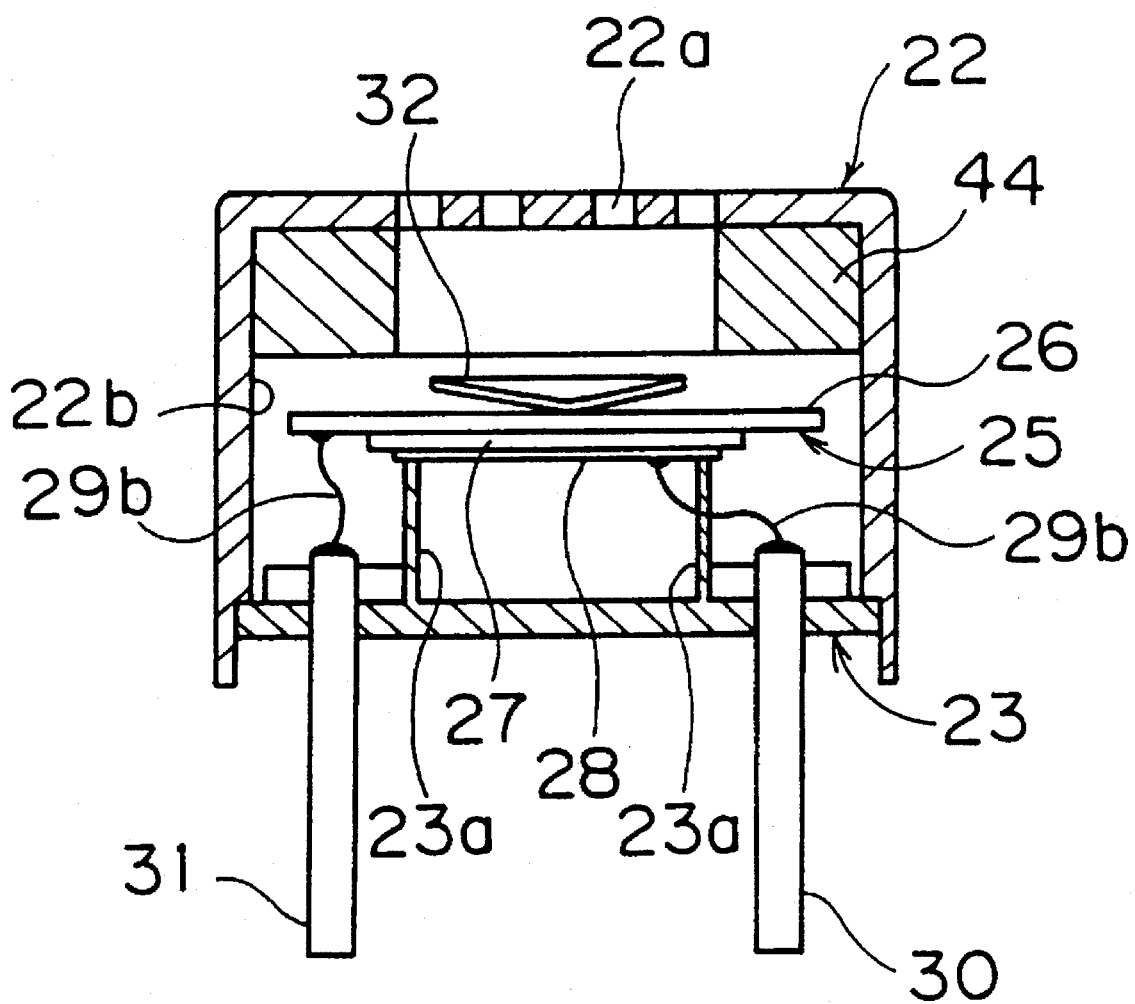
FIG. 5 is a sectional view showing another modification of the embodiment shown in FIG. 3.

In another modification shown in FIG. 5, a thick tubular member 44 reaching a side wall 22b of a case body 22 may be pasted to an inner side of a top plate, which is adapted to receive ultrasonics, of the case body 22. In this case, the tubular member 44 may be integrally formed with the case body 22, similarly to the aforementioned embodiment.

Also in the modifications shown in FIGS. 4 and 5, directivity is spread by actions of the tubular members 34 and 44. Thus, it is possible to spread the directivity without narrowing sensitivity frequency bands, similarly to the embodiment shown in FIG. 3.

Figure 6:
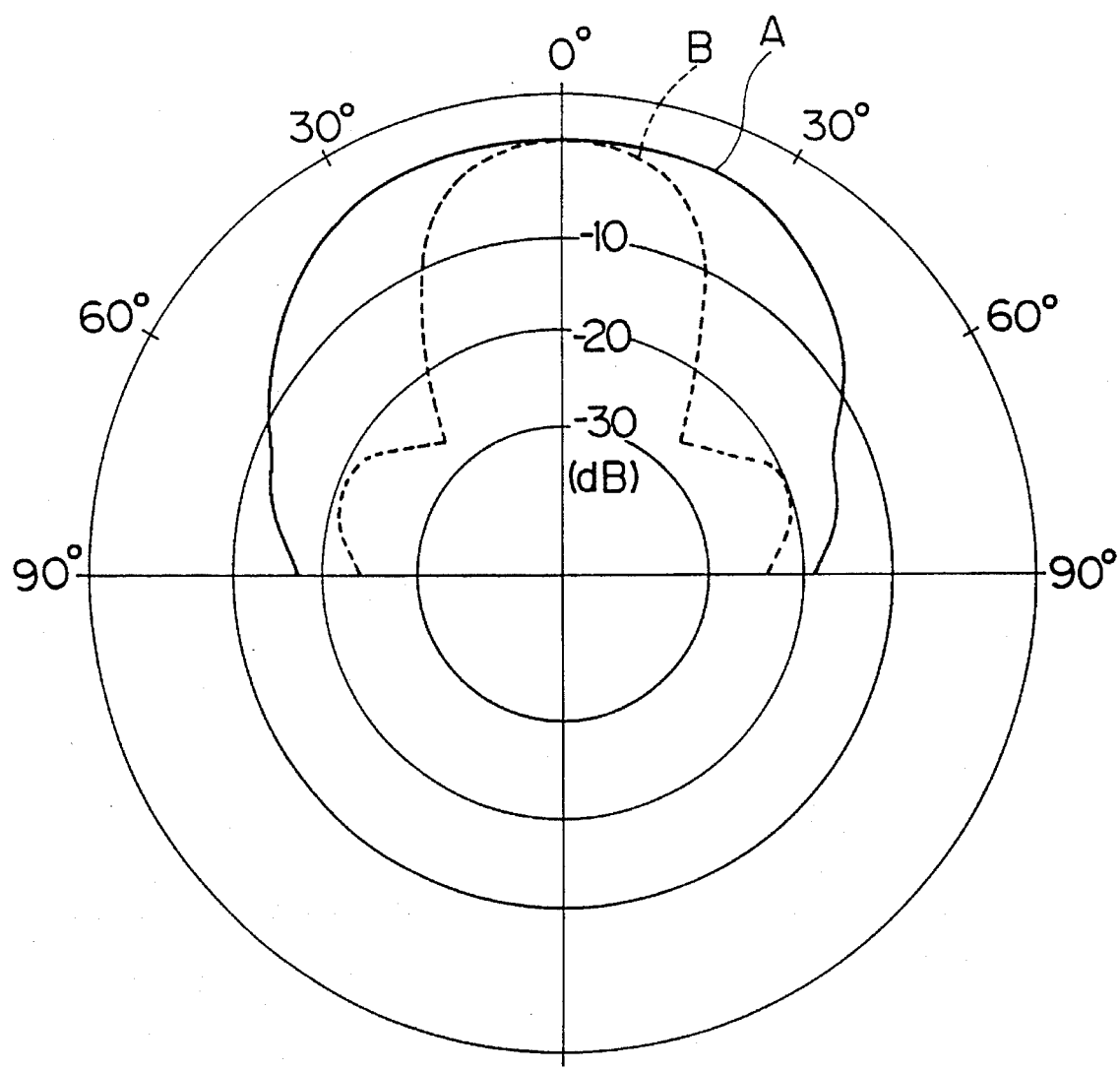
FIG. 6 is a diagram for illustrating directional patterns of the ultrasonic sensors according to the embodiment of the present invention and the prior art.

FIG. 6 is a diagram for illustrating directivity in the embodiment shown in FIG. 3. Referring to FIG. 6, a solid line A shows a directional pattern obtained by the embodiment, while a broken line B shows a directional pattern of a conventional ultrasonic sensor provided with no tubular member 24. Comparing the solid line A with the broken line B, it is understood possible to extremely spread the directivity by providing the tubular member 24.

According to an experiment made by the inventor, attenuation of sensitivity within a range of ±30° with respect to the front surface of an ultrasonic sensor was −16 dB in the conventional sensor, while such attenuation was extremely reduced to −2 dB in the ultrasonic sensor according to the embodiment provided with the tubular member 24, while no difference was recognized between sensitivity frequency characteristics of the former and the latter.

While the embodiment has been described with reference to a unimorph type piezoelectric diaphragm, the piezoelectric diaphragm may alternatively be formed by a bimorph type diaphragm.

While the aforementioned embodiment is applied to a receiving sensor, the present invention is also applicable to a transmission sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ultrasonic sensor comprising:

a case being provided with at least one through hole in a surface for receiving/transmitting ultrasonics;

a piezoelectric diaphragm being arranged in said case;

a vibrator being bonded to a surface of said piezoelectric diaphragm for transmitting/receiving ultrasonics and to vibrate with said piezoelectric diaphragm; and a tubular member having a cylindrical inner surface formed with a substantially uniform diameter along an axial direction of said tubular member and being arranged in said case in front of said vibrator for guiding ultrasonics from said vibrator to the exterior of said case or from the exterior to said vibrator and said piezoelectric diaphragm.

2. An ultrasonic sensor in accordance with claim 1, wherein said tubular member has an inner diameter being larger than the maximum outer diameter of said vibrator.

3. An ultrasonic sensor in accordance with claim 2, wherein said vibrator is formed by an equalizer having a conical shape, said inner diameter of said tubular member being 1.2 to 1.5 times the maximum outer diameter of said vibrator.

4. An ultrasonic sensor in accordance with claim 1, wherein an end surface of said tubular member is fixed to an inner surface of said case for transmitting/receiving ultrasonics.

5. An ultrasonic sensor in accordance with claim 4, wherein said tubular member is so fixed that said through hole communicates with the interior of said tubular member.

6. An ultrasonic sensor in accordance with claim 4, wherein said tubular member is integrally formed with said case.

7. An ultrasonic sensor in accordance with claim 2, wherein an end surface of said tubular member is fixed to an inner surface of said case for transmitting/receiving ultrasonics.

8. An ultrasonic sensor in accordance with claim 3, wherein an end surface of said tubular member is fixed to an inner surface of said case for transmitting/receiving ultrasonics.

9. An ultrasonic sensor in accordance with claim 5, wherein said tubular member is integrally formed with said case.

* * * * *